United States Patent [19]

Walker

[11] Patent Number: 4,656,769

[45] Date of Patent: Apr. 14, 1987

[54] FISHING DEVICE

[76] Inventor: Larry L. Walker, 691 S. Zinnia Ct., Lakewood, Colo. 80228

[21] Appl. No.: 588,942

[22] Filed: Mar. 13, 1984

[51] Int. Cl.$^4$ .......................... A01K 97/00; D03J 3/00
[52] U.S. Cl. .............................................. 43/1; 242/1; 289/17
[58] Field of Search .................... 43/1, 4, 42.53; 57/4, 57/10; 242/1; 289/17; 81/177.2

[56] References Cited

U.S. PATENT DOCUMENTS

| Re. 29,604 | 4/1978 | Matarelli | 289/17 |
|---|---|---|---|
| 2,148,799 | 2/1939 | Bilinski | 43/42.53 |
| 2,496,927 | 2/1950 | Witte | 43/42.53 |
| 2,725,086 | 11/1955 | Keyes et al. | 81/177.2 |
| 4,169,562 | 10/1979 | Renzetti | 43/1 |
| 4,184,645 | 1/1980 | Starling | 43/1 |
| 4,333,614 | 6/1982 | Flax | 57/10 |

Primary Examiner—M. Jordan
Attorney, Agent, or Firm—Norvell E. Von Behren

[57] ABSTRACT

A device for use in the assembly of fishing flies and in particular the attachment of loose dubbing material to the thread used in making the fishing fly is disclosed. The device comprises an elongated rod which has positioned around a portion of the rod means for holding the rod while permitting the rod to be rotated as desired. On one end of the rod is attached rotating means for rotating the rod at predetermined speeds within the holding means. The other end of the elongated rod has formed thereon gripping means for gripping the thread used in the assembly of the fishing fly in a spaced apart manner. The dubbing is positioned between the spaced apart thread and the elongated rod may be rotated to tightly wrap the thread around a portion of the dubbing. The method for attaching dubbing to a thread using the applicants device is also disclosed. The device may be used in a modified form as a conversation piece and as a pacifier for nervous people such as executives.

4 Claims, 13 Drawing Figures

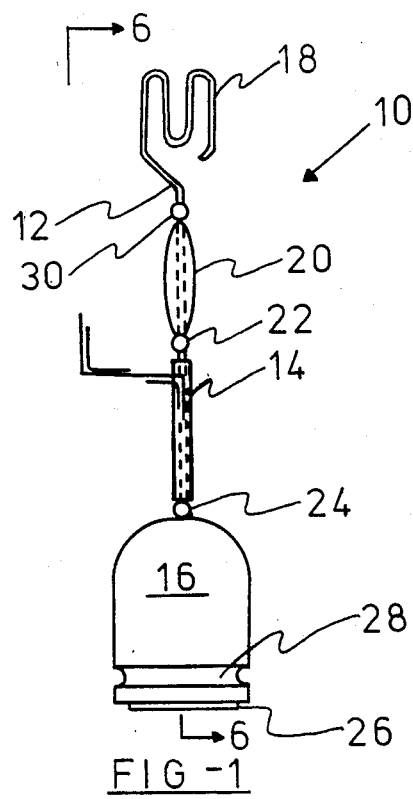
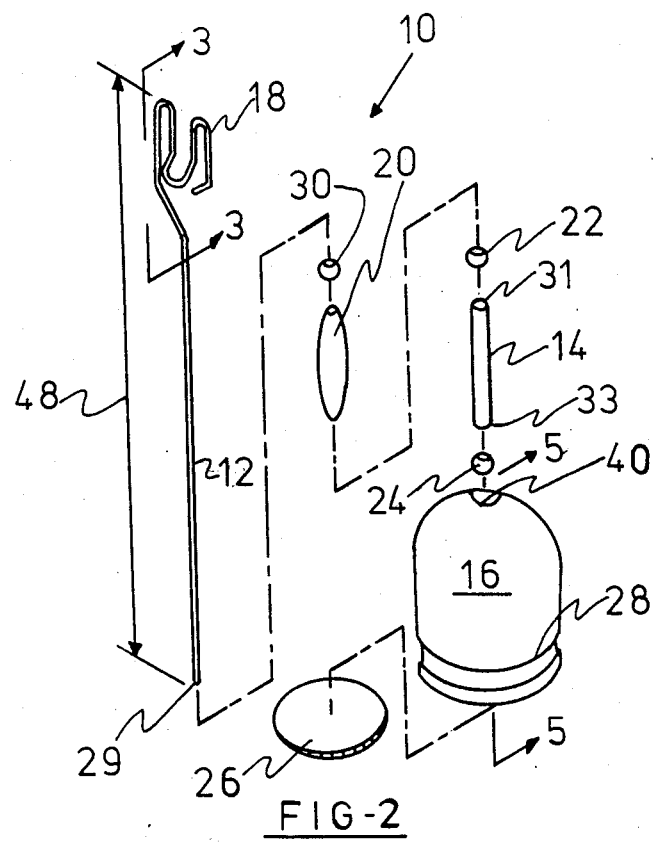
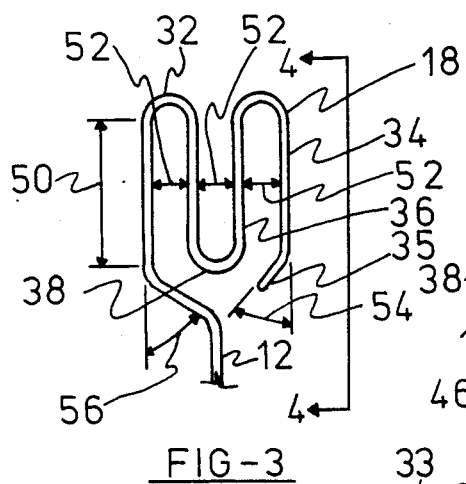
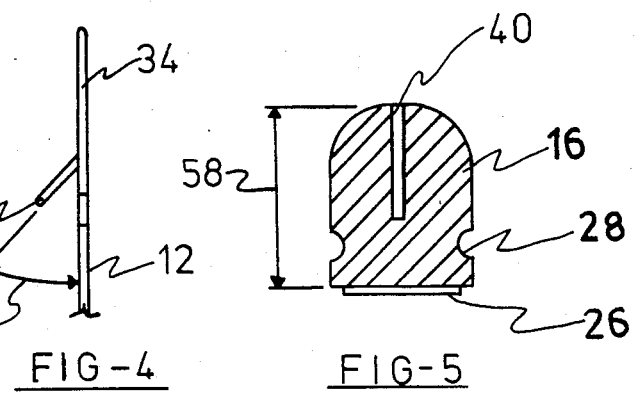
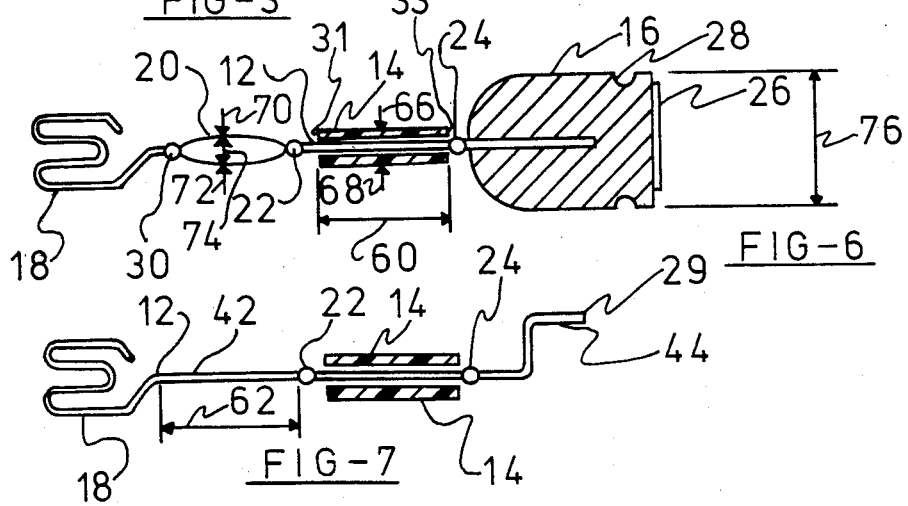

FISHING DEVICE

BACKGROUND OF THE INVENTION

This invention relates generally to fishing devices and more particularly to a new and novel fishing device for use in the assembly of fishing flies.

It is known that a large majority of fisherman prefer to assemble their own fishing flies using various items attached to the fishing hook. The attachment of loose natural fur, hair and synthetic materials to a fish hook in the assembly of a fishing fly is a very difficult problem for beginning fly tiers as well as experienced and professional ones. The application of loose natural or synthetic materials known as dubbing to the fish hook shank requires a skill which requires various types of devices to aid in obtaining a tight wrap of the dubbing on the fly tying thread.

The problem of applying the dubbing to the fish hook is magnified when attempting to tie hollow hairs such as deer or antelope hairs which are used in high flotation fishing flies.

It is known that there are various devices on the market for aiding the fly tier in this problem. Several of these devices provide assistance to the fly tier by retaining a dubbing loop for insertion of the dubbing material into the loop. While these devices are somewhat satisfactory, they do not retain a constant loop which is necessary to the efficient tight twisting of the fly thread around the dubbing material.

One type of prior art device is shown in the drawing FIGS. 12-13 by the numeral 1 which comprises an elongated rod 2 having a sharp pointed end 3. A handle 4 is fixed to the rod 2 and a thread gripper 5 is formed on the one end of the rod 2 as shown. The gripper 5 is formed with a series of turns in the rod 6, 7, 8 and 9. The end 11 of the rod 2 is turned outwardly slightly as shown in FIG. 13 while the turns 6, 7, 8 and 9 are all in the same plane. No provision is made on the device to control the twisting of the dubbing loop as will be described hereinafter when referring to the applicants new and novel device.

SUMMARY OF THE INVENTION

In order to overcome problems inherent in the prior art dubbing devices and to provide a new and improved dubbing device, there is provided by the subject invention a novel device which is used in the assembly of fishing flies and which comprises an elongated rod having holding means positioned around a portion of the rod which permits the rod to be rotated or spun as desired. The holding means in the preferred embodiment takes the form of an elongated sleeve. Attached to one end of the elongated rod is rotating means for rotating the elongated rod at a predetermined speed within the holding means or the sleeve. The other end of the elongated rod has fixedly attached thereto gripping means for gripping the thread in a spaced apart manner so that the dubbing can be positioned between the spaced apart thread used to form the dubbing loop. The elongated rod can be then rotated at predetermined speeds to tightly wrap the thread around a portion of the dubbing after which the dubbing and the thread are fixed to the fishing hook in a predetermined manner.

The applicants novel device and method for using the device is designed primarily for use in fly tying. However the applicants basic device may also be used in a variety of other ways such as positioning the device as constructed on a flat surface such as a flat table with the device itself serving as a conversation piece and also serving as a pacifier for a nervous person such as a business executive. The spinning capabilities of the applicants device permits the device to be used as an executive pacifier among other types of uses.

Accordingly an object and advantage of the invention is to provide a new and novel device which may be used in the assembly of fishing flies which quickly and tightly permits dubbing to be fixed to the fly thread by spinning or rotating the device in one of several ways.

Another object and advantage of the invention is to provide a new and novel device which may be used in the assembly of fishing flies to provide a more controlled thread twist through the dubbing material to thereby prevent a possiblilty of clumping of the materials as the dubbing is completed.

Yet another object and advantage of the invention is to provide a fly tying dubbing device which allows more rotations for each spin action by the user of the device due to the novel configuration of the structure.

A further object and advantage of the invention is to provide a new and unusual device which may be positioned upright in a ready position for use by a person tying a fishing fly.

Still yet another object and advantage of the invention is to provide a new and novel fly tying device that may also be used as a conversation piece and may be sold and used as an executive pacifier.

Another object and advantage of the invention is to provide a novel fly tying device that has improved features to aid in prevention of the device from slipping through the users fingers and also to prevent the device from slipping on slick surfaces where the device may be positioned.

Yet another object and advantage of the invention is to provide a new and novel method for fixing dubbing to a thread in the assembly of a fishing fly using the applicants novel dubbing device as herein described.

These and other objects and advantages of the invention will become apparent from a review of the drawings and from a study of the description of the preferred embodiment which has been given by way of illustration only.

BRIEF DESCRIPTION OF THE DRAWINGS

FIG. 1 is a side view of the applicants novel device showing the device standing in a vertical position.

FIG. 2 is an exploded perspective view of the applicants device showing the various parts of the device in the preferred embodiment.

FIG. 3 is a side view, taken along line 3—3 of FIG. 2 showing in detail the gripping means for gripping the thread in a spaced apart manner.

FIG. 4, is a side view, taken along line 4—4 of FIG. 3 showing in greater detail the third finger of the applicants gripping device and how the third finger has an outwardly protruding end portion used to prevent nicking or cutting of the thread when the gripping means is applied to the thread.

FIG. 5 is a cross-sectional view, taken along line 5—5 of FIG. 2 showing in detail the rotating means of the applicants device for rotating the elongated rod of the device at a predetermined speed within the holding means.

FIG. 6 is a partial cross-sectional view, taken along the line 6—6 of FIG. 1 showing in greater detail the holding means of the applicants device positioned around the elongated rod between the rotating means and the gripping means.

FIG. 7 is a cross-sectional view, similar to the cross-sectional view shown in FIG. 6 showing a modification of the basic device with the rotating means comprising a crank fixedly attached to one end of the elongated rod.

DESCRIPTION OF THE PREFERRED EMBODIMENT

Figure 8:
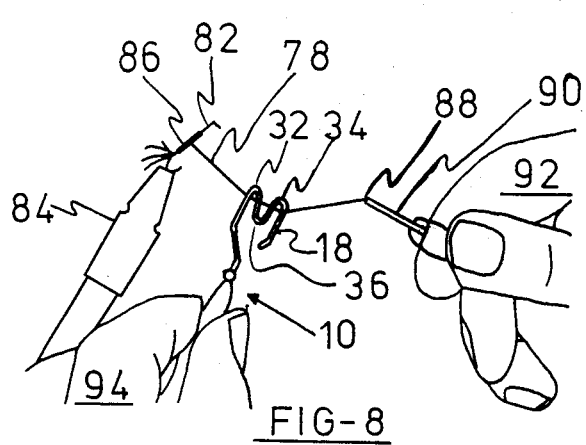
FIGS. 8 through 11 are side views showing the applicants basic device used in the method for fixedly attaching dubbing to a thread in the assembly of fishing flies.

Referring now to the drawings in general and in particular to FIG. 1 of the drawing there is shown a side view of the applicants basic device for use in the assembly of fishing flies which is shown generally by the numeral 10 and comprises an elongated rod 12 which is positioned through the holding means 14 of the applicants invention. The holding means comprises in the preferred embodiment an elongated sleeve which is positioned around a portion of the elongated rod and allows the rod 12 to be rotated as will be hereinafter described. The rotating means 16 of the applicants invention comprises a weight in the preferred embodiment which is fixedly attached to one end of the elongated rod. The weight serves as a fly wheel for rotating the rod at a predetermined speed by the user of the device.

The opposite end of the elongated rod 12 contains the gripping means 18 of the applicants device which is used to grip the thread in a spaced apart manner so that the dubbing can be positioned between the spaced apart threads and the elongated rod which will be rotated to tightly wrap the thread around a portion of the dubbing. The use of the applicants device will be detailed more fully hereinafter especially when referring to the drawing FIGS. 8 through 11.

Surrounding a portion of the elongated rod is the spinning means 20 which may be used with the basic device for spinning the rod at a faster predetermined speed within the holding means 14 than the speed obtained by using the rotating means 16 as will be described more fully hereinafter. In the preferred embodiment shown in FIG. 1, the spinning means 20 comprises an elongated bead formed of wood, glass or some other means which is tightly positioned on the elongated rod in the position shown in FIGS. 1 and 2.

A pair of fixed bearing members 22 and 24 in the form of brass beads are fixedly attached to the elongated rod 12 in the position shown in FIG. 1 and serve as bearing surfaces to allow the elongated rod 12 to more freely rotate in the sleeve or holding means 14.

A groove 28 is positioned around the rotating means 16 to provide for an easier gripping of the rotating means when the device is rotated by holding the sleeve or holding means 14 and rotating the rotating means 16 by tightly grasping the users fingers on the rotating means and turning the device.

A cushion or pad 26 is adhesively secured to the bottom of the rotating means 16 to allow the device to sit upon a flat surface without scratching the surface.

Referring now to FIG. 2 of the drawing there is shown an exploded perspective view of the preferred embodiment shown in FIG. 1 and showing how the various parts are positioned together. As has been before mentioned, the elongated rod 12 is positioned through a brass bead 30 and through a spinning means 20 in the form of a wooden bead or a glass or plastic bead as desired. The elongated rod 12 is also positioned through a second brass bead 22 which serves as a fixed bearing member as has been before described and the rod then passes through the sleeve or holding means 14. The brass bead 24 serving as the other fixed bearing member receives the end of the elongated rod 12 after which the rod is positioned into an elongated drilled hole 40 in the rotating means 16. The elongated drilled hole 40 is shown more clearly in FIG. 5 of the drawing. The end of the rod 29 would be tightly fixed in the drilled hole 40 and may be held thereto by adhesive or a press fit as desired. In a similar manner the brass beads 22 and 24 would be tightly fixed to the elongated rod in the position shown and would be spaced somewhat apart from the ends 31 and 33 of the sleeve or holding means 14. When fastened thusly the sleeve 14, which is loosely positioned around the elongated rod 12 would allow the rod 12 to be rotated within the sleeve by rotating the weight or rotating means 16.

The spinning means 20 in the form of a wooden, glass or plastic bead would be fixed to the elongated rod 12 by adhesive or some other suitable means and the brass bead 30 would also be fixed in a similar manner.

Referring now to FIG. 3 of the drawing, there is shown an enlarged view, taken along line 3—3 of FIG. 2 showing in detail the gripping means 18 of the applicants invention. The gripping means 18 comprises an inverted W-shaped portion as shown in FIG. 3 for tightly gripping the thread used in tying flies. In the preferred embodiment the gripping means 18 is formed integrally with the elongated rod by bending the upper end of the rod into the W-shaped portion shown forming a pair of spaced apart fingers 32 and 34 and also forming a third finger 36 which extends in a direction opposite to the direction of the fingers 32 and 34.

The third finger 36 has an outwardly protruding end portion 38 which prevents a nicking or cutting of the thread when the applicants device with the gripping means is applied to the thread as will be shown hereinafter when referring to FIGS. 8 through 11 of the drawings. The angle of the outwardly protruding end 38 would be approximately 45° as shown by the numeral 46 in FIG. 4 of the drawing.

When forming the gripping means 18, the height of the gripping means would be approximately ½ of an inch as shown by the numeral 50 and the spacing of the fingers 32, 34 and 36 would be approximately ¼ of an inch as shown by the numerals 52 in FIG. 3 of the drawing. The end of the elongated rod 35 would be turned inwardly in the direction shown in FIG. 3 at an angle of approximately 45° as shown by the numeral 54. In bending the gripping means 18 shown in FIG. 3 of the drawing, the upper portion of the elongated rod would be bent at approximately 30° as shown by the numeral 56 after which the fingers 32, 34 and 36 would be bent to the configuration shown in FIG. 3.

Referring now to FIG. 5 of the drawing there is shown a cross-sectional view, taken along line 5—5 of FIG. 2 showing in greater detail the rotating means 16 of the applicants device which may be formed of wood, metal or some other materials suitable to allow the applicants device to be rotated and suitable to act as a fly wheel since the continued rotation of the applicants device is used in the fly tying operation as will be described hereinafter. The height of a rotating means 16 would be approximately 1½" as shown by the numeral 58 when the rotating means were formed of wood.

Referring now to FIG. 6 of the drawings there is shown a partial cross-sectional view, taken along line 6—6 of FIG. 1 showing in more detail how the sleeve or holding means 14 is positioned to loosely surround the elongated rod 12 to allow the applicants device to rotate. An acccptable length for the sleeve 14 would be approximately 15/16" as shown by the numeral 60 and the sleeve may be formed out of plastic or some other suitable material. As has been before mentioned the brass beads 22 and 24 fixed to the elongated rod 12 serve as bearing members so that the ends 31 and 33 of the sleeve can bear against the beads 22 and 24 allowing the weight 16 to be rotated and to continue rotation without friction developing.

It can be seen in FIG. 6 that the spinning means 20 may be used to spin the elongated rod 12 with the weight 16 attached at a faster predetermined speed within the sleeve 14 than the speed that may be obtained by rotating the weight 16 with one's fingers. In order to accomplish this, the sleeve 14 would be held between the fingers in the position shown approximately by the arrows 66 and 68. The fingers of the other hand would then be positioned approximately in the area shown by the arrows 70 and 72 on the spinning means and the fingers would be rotated rapidly after squeezing the spinning means to cause the elongated rod 12 with the gripping means 18 to rotate along with the weight 16 which will act as a fly wheel or counterweight. Since the bead or spinning means 20 has been fixed to the elongated rod 12 then any torque applied to the bead 20 will cause the elongated rod to rapidly rotate. In addition since the bead 20 is constructed with a smaller diameter 74 than the diameter 76 of the weight 16, a higher rotation speed will be applied to the elongated rod 12 to rotate it.

From this it can be seen that the elongated rod 12 can be rotated either by turning the weight 16 and holding the sleeve 14 or by turning the spinning means or bead 20 while holding the sleeve 14.

Referring now to FIG. 7 of the drawing there is shown a modification of the applicants basic device wherein the rotating means 16 in the form of the weight shown in FIG. 6 has been replaced by a rotating means 44 in the form of a crank end formed on the end 29 of the elongated rod 12. When constructed in this modification, it can be seen that the sleeve 14 would be held in the manner hereinbefore described and the crank 44 would be turned or rotated to rotate the gripping means 18. If it were desired to rotate the elongated rod 12 faster, then the elongated rod can be spun by gripping the portion shown by the numeral 42 and spinning it rapidly between the fingers. In the modification shown in FIG. 7, the area shown by the numeral 62 could also have applied thereto a bead or spinning means 20 which would be fixedly attached to the elongated rod to allow for a more firm grip in spinning the elongated rod.

Figure 9:
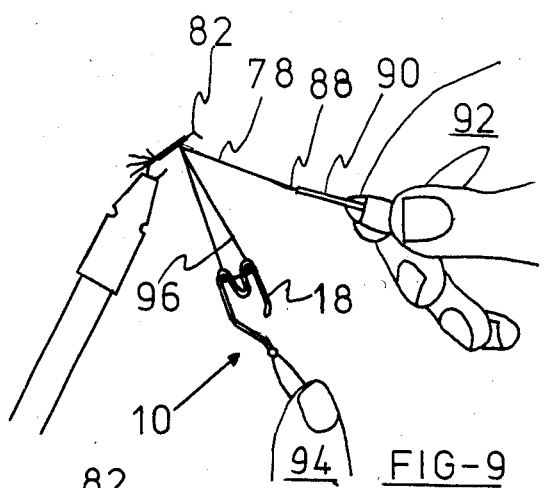

Referring now to FIGS. 8 through 11 of the drawing there will be described in detail how the applicants basic device will be used with a thread 78 and with dubbing 80 in the assembly of the fishing fly 82. The fishing fly 82 would be held by a tool 84 with the end 86 of the thread 78 being tied to the fishing fly 82. The other end 88 of the thread 78 would be held in a tool 90 which is held by the fingers 92 of the user's one hand. The fingers 94 of the user's other hand would hold the applicant's device 10. A dubbing loop 96 would be formed by holding both ends of the thread apart and by gripping the central portion of the thread with the gripping means 18. The gripping means 18 would be positioned over the thread 78 with the thread being tightly held by the fingers 32, 34 and 36 of the gripping means 18. After the dubbing loop 96 is formed, the end of the loop is wrapped around the fishing fly 82 as shown in FIG. 9.

Figure 10:
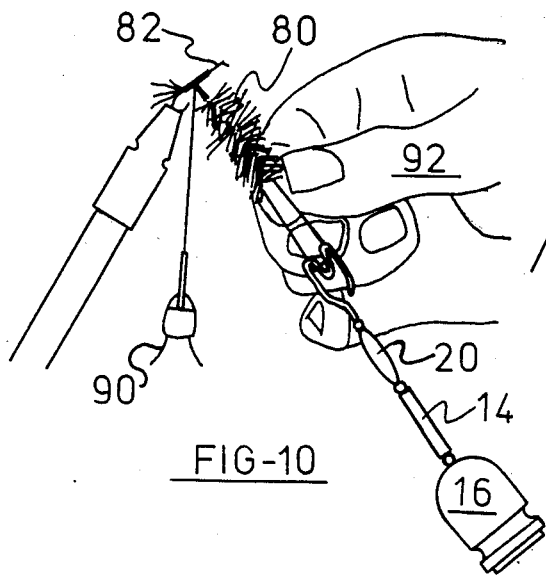
Figure 11:
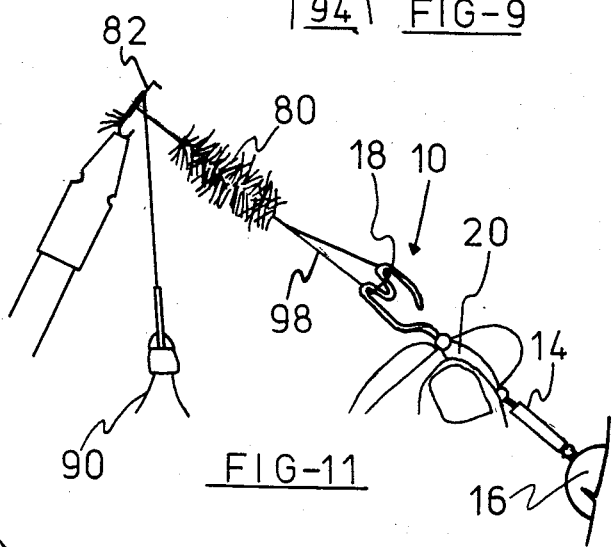
Figure 12:
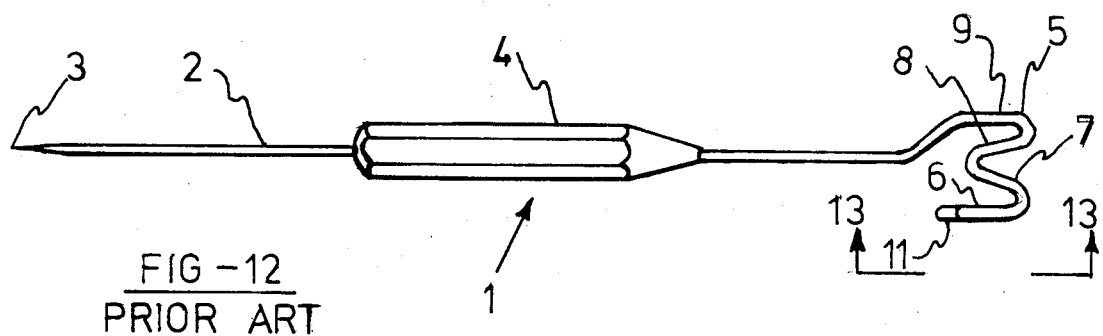
FIG. 12 is a side view of one type of prior art device.
Figure 13:
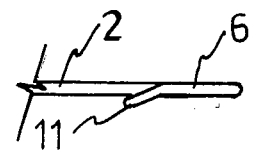
FIG. 13 is a partial side view, taken through lines 13—13 of FIG. 12.

Thereafter a predetermined amount of dubbing 80 could be inserted into the dubbing loop 96 as shown in FIG. 10 of the drawings. In order to tightly twist the thread 78 around the dubbing 80 the applicants device 10 is held as shown in FIG. 11 of the device. By allowing the tool 90 to hang free as shown in FIGS. 10 and 11, the dubbing 80 may be fastened to the dubbing loop as the applicants device 10 is rotated or spun. By using the spinning means 20 in the form of the bead shown, the twisted thread shown as the numeral 98 will spin and tightly hold the dubbing in place as shown in FIG. 11.

Thereafter the tightly tied dubbing 80 may be attached to the fishing fly 82 as desired by the person tying the fly. The applicants device can also be used thereafter with various other movements in order to tie the particular dubbing as desired to the fishing fly 82 to provide the attractive fly which will hopefully attract fish when used in the usual manner.

The applicants basic device is especially useful in the assembly of fishing flies formed of hollow hairs such as deer and antelope hair, furs or synthetic materials can be used within the spirit and scope of the invention.

The novel gripping means 18 provides a constant loop size which allows for a more even dub and the flat plane design of the gripping means especially as shown in FIG. 4 of the drawing locks the tying thread 78 into the gripping means at the fingers 32, 34 and 36 permitting the dubbed loop to be wrapped around the fishing fly 82 without removal from the tool 84. The applicants novel device 10 also provides an easier method of establishing the dubbing loop 96 and the outwardly protruding end 38 or bend in the third finger 36 prevents a nicking or cutting of the tying thread whenever the gripping means is positioned over the thread 78 as shown in FIG. 8 of the drawing.

While various dimensions have been given in the specification as a preferred embodiment of the invention, other size dubbing tools 10 may be constructed and the various dimensions may be changed within the spirit and scope of the invention.

The applicants basic device when constructed as shown in the various figures of the drawing may be positioned on a flat surface by standing it upright as shown in FIG. 1 of the drawing and when positioned thusly serves also as a conversation piece since it is an unusual appearing device. It has also been found that since the device is able to be rotated as before mentioned, the device can serve not only as a fishing fly tying device but also as an executive type pacifier which may be positioned on a desk and picked up by the executive who may desire to rotate it at rapid speed in order to relieve nervous tension. When used in this manner, the gripping means 18 of the applicants basic device may serve as a conversation forming means since it is not apparent from looking at tne device exactly what it is for unless a person is a fishing enthusiast and especially would be a fly tier either as an amatuer or a professional. The conversation forming means or gripping means 18 may also be used to hold a business card or a note from a secretary should the device be sold to an executive who would position it on his desk. The gripping means 18 could be replaced by various other items on the end of the elongated rod thereby making the conversation piece more attractive and saleable in that manner.

The elongated rod in the embodiments shown would be constructed of brass rod and the various beads 22, 24 and 30 would also be formed of brass or some other material. As has been before mentioned the spinning means 20 may be constructed of a wooden bead, a brass bead, a plastic or glass bead and can also be constructed of other materials in order to make the item more attractive in appearance as desired.

Various configurations of the rotating means 16 in the form of the weight are within the spirit and scope of the invention and the applicant is not to be limited to the exact configuration shown which has been given by way of illustration only.

From the foregoing it can be seen that there has been provided by the applicants invention a new and novel device which may be used in the assembly of fishing flies and may also be used as a conversation piece either by a fisherman or by an executive or some other person that may wish to purchase the applicants device. It should be apparent from a review of the drawings and from a study of the preferred embodiment given herein that changes may be made in the particular configuration and in the particular arrangement of the parts within the spirit and scope of the invention. The applicant is not to be limited to the exact embodiment or modifications given which have been give by way of illustration only.

Having described my invention, I claim:

1. A hand held device for use with thread or the like and with dubbing in the assembly of fishing flies, the device being used by a user having a plurality of fingers, comprising:
    (a) an elongated rod having opposite ends;
    (b) means, positioned around a portion of the elongated rod, for holding the rod with a portion of the user's fingers while permitting the rod to be rotated as desired;
    (c) means, associated with and fixedly attached to one end of the rod, for rotating the rod at a predetermined speed within the holding means, the rotating means comprising a weight fixedly attached to one end of the rod, the weight serving as a flywheel for rotating the rod at the predetermined speed; and
    (d) means, associated with the fixedly attached to the other end of the rod, for gripping the thread in a spaced apart manner so that the dubbing can be positioned between the spaced apart thread on the other end of the rod and the elongated rod can be rotated by another portion of the user's fingers to tightly wrap the thread around a portion of the dubbing.

2. A hand held device for use with thread or the like and with dubbing in the assembly of fishing flies, the device being used by a user having a plurality of fingers, comprising:
    (a) an elongated rod having opposite ends;
    (b) means, positioned around a portion of the elongated rod, for holding the rod with a portion of the user's fingers while permitting the rod to be rotated as desired;
    (c) means, associated with and fixedly attached to one end of the rod, for rotating the rod at a predetermined speed within the holding means;
    (d) means, associated with the fixedly attached to the other end of the rod, for gripping the thread in a spaced apart manner so that the dubbing can be positioned between the spaced apart thread on the other end of the rod and the elongated rod can be rotated by another portion of the user's fingers to tightly wrap the thread around a portion of the dubbing; and
    (e) means, associated with the elongated rod for spinning the rod at a faster predetermined speed within the holding means than the speed obtained by the rotating means, the spinning means and the holding means being positioned adjacent to each other and along the elongated rod.

3. The device as defined in claim 2 wherein the spinning means comprises the elongated rod being formed in two portions, with the holding means being positioned around one portion and with the other portion being used to spin the rod by the user of the device.

4. The device as defined in claim 3 wherein the other portion has fixedly attached thereto a spinning bead.

* * * * *